April 16, 1968  G. H. GORDON-COOPER  3,377,983
ADJUSTABLE PROGRAM AND PROGRESS INDICATOR
Filed May 14, 1965
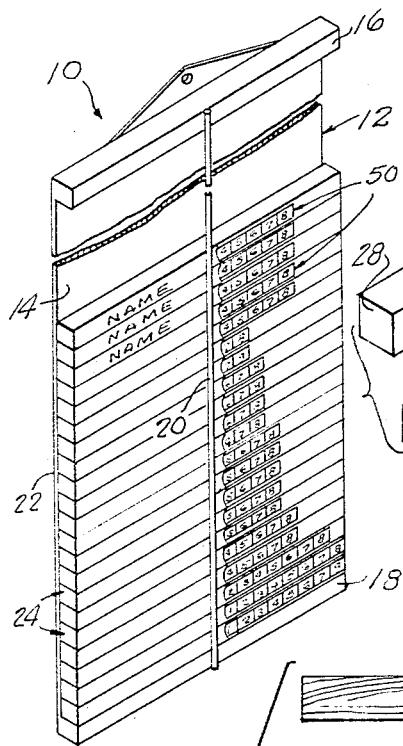
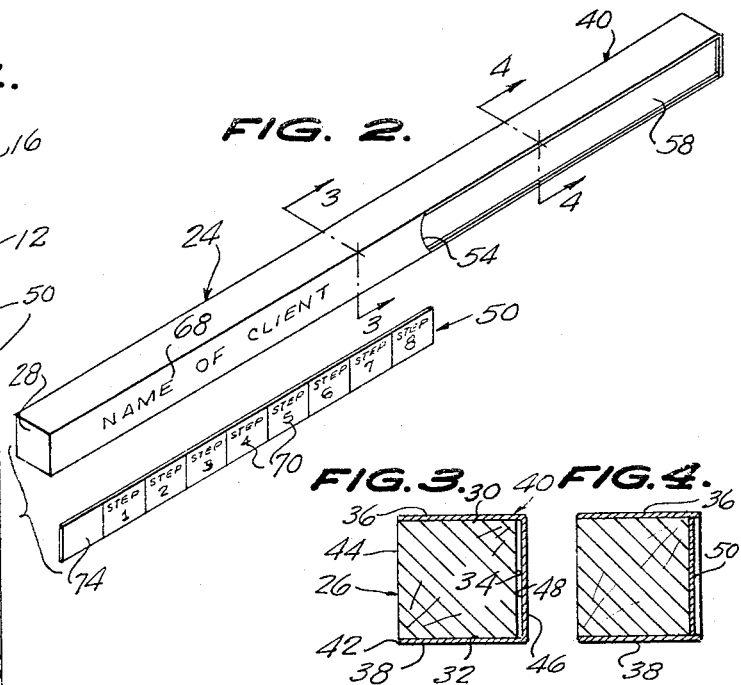
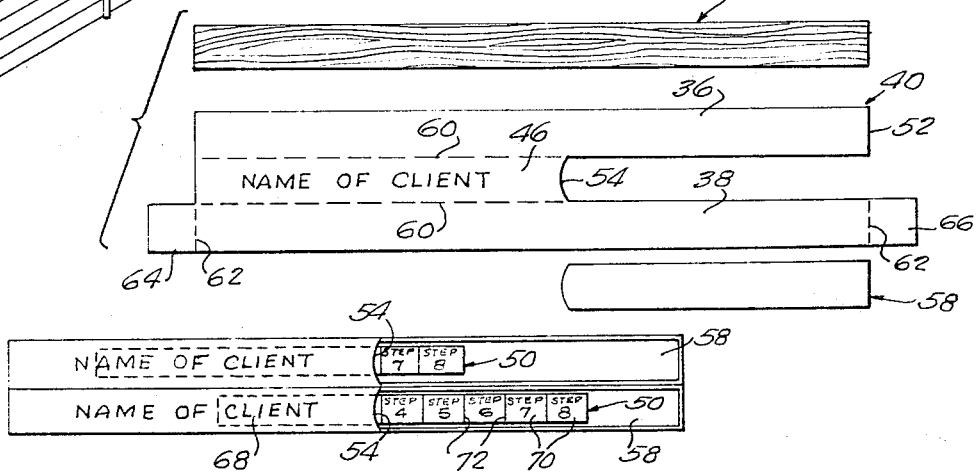
INVENTOR.
GEORGE H. GORDON-COOPER,
BY
Berman, Davidson + Berman
ATTORNEYS.

United States Patent Office 3,377,983
Patented Apr. 16, 1968

3,377,983
ADJUSTABLE PROGRAM AND
PROGRESS INDICATOR
George H. Gordon-Cooper, 976 W. 32nd Ave.,
Vancouver 9, British Columbia, Canada
Filed May 14, 1965, Ser. No. 455,897
3 Claims. (Cl. 116—135)

ABSTRACT OF THE DISCLOSURE

An indicator comprising a support; a stick of indicator blocks slidable on said support and on each other; each of said blocks having a slideway extending for part of its length and an indicator strip insertable in said slideway, each strip having indicia spaced along its length, a portion of such indicia being insertable with said strip into said slideway and being concealed thereby to reveal on the indicia representing steps not yet taken.

This invention relates to an adjustable program and progress indicator.

In conducting a client service program or other work program, it is essential, in the interest of elimination of oversight and error, and the orderly conduct of the service or work, as well as the reduction of time and effort expended therein, to establish and maintain such practical means to these ends.

The primary object of the present invention is the provision of an efficient, simple, practical, and easily used, and instantly available device, for the purposes indicated above, which is adapted to be adjusted periodically, at the times services or work operations are performed, to show, as to one or a plurality of clients or jobs, the services or operations remaining to be performed, while, at the same time, concealing the services or operations already performed.

Another object of the invention is the provision of a device of the character indicated above, which comprises a rack, adapted to removably support a plurality of blocks, in stacked relationship, each block being marked with the name or other designation of a client or work job, each block having a slideway, in which is slidably engaged a strip, the strip having indicated therealong successive services or work operations to be performed, the strips being adapted to be engaged in their slideways, in a manner to indicate, initially, all of the services or operations to be successively performed, and subsequently, only all of the services or operations remaining to be performed.

In the drawings:

FIGURE 1 is a contracted perspective view of a device of the invention, showing stacked indicator blocks supported thereon.

FIGURE 2 is an enlarged exploded perspective view of an indicator block, and an associated indicator strip;

FIGURES 3 and 4 are further enlarged vertical transverse sections, taken on the lines 3—3 and 4—4, respectively, of FIGURE 2;

FIGURE 5 is a group view of the components of an indicator block; and

FIGURE 6 is a front elevation of two adjacent stacked indicator blocks, showing their strips inserted therein, at different depths, in order to indicate different numbers of services or operations remaining to be performed, after the completion of preceding services or operations.

Referring in detail to the drawings, the illustrated device comprises a rack 10, adapted to be supported on a wall or by other means, and comprising a vertically elongated rectangular plate 12, having a flat front surface 14, and provided, at its upper and lower ends, with forwardly extending, similar upper and lower horizontal ledges 16 and 18, respectively. A centered vertical retaining bar 20, is suitably affixed to the forward surfaces of the ledges 16 and 18.

Adapted to rest removable upon the lower ledge 18, between the retaining bar 20 and the front surface 14, of the plate 12, with their ends aligned with the side edges 22 of the plate 12, in stacked relationship, is a plurality of similar, horizontally elongated indicator blocks 24.

As shown in FIGURES 2 to 4, each of the indicator blocks 24 comprises an elongated rectangular cross-section body 26, having squared ends 28, parallel upper and lower surfaces 30, and 32, respectively, and front surfaces 34.

Suitably affixed to the upper and lower surfaces of the body 26 are the upper and lower flanges 36 and 38, respectively, of a channel-shaped cover 40, which can be made of any suitable thin material, such as heavy paper. The flanges 36, 38, as shown in FIGURES 3 and 4, are wider than the body surfaces 30 and 32, respectively, so that, when the rear edges 42 of these flanges are arranged flush with the rear surface 44 of the body 26, the vertical web or front flange 46, of the cover 40, is parallel spaced forwardly front the front surface 34 of the body 26, so as to define a slideway 48, adapted to slidably accept an indicator strip 50.

As shown in FIGURES 5 and 6, the front flange or web 46 of the cover 40 is discontinuous, from one end, preferably, the right-hand end 52 of the cover 40, and is provided with a free, preferably concave entrance edge 54. The space extending along the front surface 34 of the body 26, from a point inwardly of the concave edge 54, to the right-hand end of the body, is adapted to be covered by a supplementary strip 58, preferably, of the same material as the cover, and secured in place, by any suitable means.

As also shown in FIGURES 5 and 6, the upper and lower flanges 36 and 38, of the cover 40, are connected to the front flange 46 thereof, by horizontal fold lines 60, and the opposite ends of the lower flange 38, are connected by vertical fold lines 62, to end tabs 64 and 66, which are adapted to be secured, by any suitable means, to the ends of the body 26. The right-hand end tab 66 serves to securely mount the supplementary strip 58. The left-hand end tab 64 serves a similar purpose, and, in addition, provides a stop for the adjacent end of an indicator strip 50.

The name of the client being served or the designation of the job of work to be done, is placed, in any suitable manner, as indicated at 68, along the front surfaces of the front flange or web 46 of the cover 40.

Each indicator strip 50 is somewhat narrower than the space between the upper and lower flanges of the cover 40, and somewhat narrower than the front flange or web 46 thereof, and is preferably only slightly longer than the web 46, so that when the strip 50 is fully inserted in the slideway 48, only a short right-hand end portion of the strip remains out of the slideway, to serve as a tab for withdrawing the strip.

Suitably marked upon the front surface of the indicator strip 50, consecutively from left to right, are indicia 70, preferably separated by vertical marks 72, therebetween, which indicia show the services or work operations to be performed, in this order, at designated time intervals.

In use and operation, initially, a blank left-hand end portion 74 of an indicator strip 50 is inserted in the slideway 48 of a block 24, so as to exhibit, on the strip, all of the services or operations to be performed. Subsequently, as each successive service or operation is performed, the strip is further inserted, so as to conceal, in the slideway, the step or steps performed, and to exhibit the steps remaining to be performed.

What is claimed is:

1. A program and progress indicator comprising a support, an indicator block carried by the support, said block having a slideway thereon having an entrance end, and an indicator strip having a leading end inserted in the slideway, said strip having indicia spaced therealong, said indicia running from the leading end of the strip toward its trailing end in the successive order in which the steps of a program are to be undertaken, the strip being adapted to be further inserted in the slideway as successive steps are performed so as to exhibit on the part of the indicator strip remaining out of the slideway the remaining steps to be performed, said block comprising a horizontally elongated, rectangular cross-section body having upper and lower and front surfaces, a channel-shaped cover having upper and lower and front flanges, the upper and lower flanges being secured upon the upper and lower surfaces of the block, the front flange of the cover being spaced forwardly from the front surface of the block, said front flange, said front surface, and the upper and lower flanges defining a slideway, said slideway having an entrance end, said indicator strip being inserted in the slideway from said entrance end, said entrance end being spaced from the ends of the body.

2. A program and progress indicator according to claim 1, strip being inserted in the slideway from said entrance end, said entrance end being spaced from the ends of the body, the front flange of the cover having a concave end edge at the entrance end of the slideway.

3. A program and progress indicator according to claim 2, said front surface of the body having an uncovered portion exposed between the entrance end of the slideway and an end of the body, and a supplementary strip secured upon said uncovered portion.

References Cited

UNITED STATES PATENTS

| | | | |
|---|---|---|---|
| 1,268,613 | 6/1918 | Rudebough | 35—24.2 |
| 1,418,765 | 6/1922 | Williamson | 40—64 |
| 2,497,285 | 2/1950 | Allardice | 40—62 |
| 2,544,445 | 3/1951 | Corzilius | 115—135 |
| 2,548,657 | 4/1951 | Dunn | 35—24.2 |
| 2,584,511 | 2/1952 | Stockfleth et al. | 116—135 |
| 2,629,184 | 2/1953 | Johnson | 116—135 |
| 2,649,790 | 8/1953 | Johnson | 116—135 |
| 2,994,296 | 8/1961 | Waldin | 116—135 |
| 3,108,567 | 10/1963 | Seitz | 116—135 |
| 3,168,787 | 2/1965 | Surrey | 40—65 |

LOUIS J. CAPOZI, *Primary Examiner.*